United States Patent Office 3,265,492
Patented August 9, 1966

3,265,492
METHOD OF UTILIZING ELECTROLYTIC CELL SLUDGE BY RECOVERING CALCIUM METAL THEREFROM
Paul R. Juckniess, Midland, Mich., assignor to The Dow Chemical Company, Midland, Mich., a corporation of Delaware
No Drawing. Filed Sept. 3, 1963, Ser. No. 306,350
21 Claims. (Cl. 75—135)

This invention relates to a method of utilizing electrolytic sodium cell sludge, and more particularly to a method of recovering calcium values from and by use of the sludge produced in sodium and calcium containing electrolytic cells.

In the production of sodium by the electrolysis of fused sodium chloride and calcium chloride as in a Downs cell, calcium chloride is usually added in order to lower the melting point of the bath. During electrolysis, calcium metal, as well as sodium metal, is produced at the cathode. Ordinarily, at the temperature of operation of the electrolytic cell, calcium tends to dissolve in the sodium metal. When the solution is removed from the cell most of the calcium metal crystallizes out of the sodium metal upon cooling. The crude sodium product mixture is ordinarily purified by mechanical separation such as filtration. The residue or sludge obtained from such a separation consists of a mixture of solids containing crystals of calcium embedded in a matrix of sodium and also contains impurities such as sodium and calcium oxides and chlorides. The total amount of metals in the residue generally varies but ordinarily it is about 70 to about 90 weight percent. Calcium is usually present in amounts of from about 8 to about 30 weight percent.

Many attempts have been made to recover the sodium component from the sludge. It has, however, been shown to be impractical as a commercial practice. The ordinary method of dealing with the sludge of electrolytic cells is to simply dispose of the sludge. One common method of disposal is to put the sludge into sealed cans and barge the cans out into the ocean. Once out in the ocean, the cans are thrown over the side of the barge and pierced by gun fire. When the sludge in the can contacts the water an explosion usually occurs from the reaction with water of the sodium and calcium in the sludge. This process is expensvie since transport and other costs must be maintained in addition to the loss of metal values in the sludge.

Still another method suggested for dealing with the electrolytic cell sludge is to treat the sludge with a lower alcohol. In this manner a higher alcohol is allegedly produced. In producing the higher alcohol the sodium present in the sludge is reacted and calcium is allegedly left free and available as pure metal.

Processes that have recovered sodium or calcium from the sludge have not ordinarily paid for the cost of processing and when employed are generally used primarily as a preferred means of disposal. Heretofore, chemical processes for separating calcium values from sodium sludge have not resulted in byproducts sufficiently valuable to make the separation process attractive.

In accordance with the present invention, metal values, may be recovered from the previously useless sludge by melting and mixing the sludge under an inert atmosphere with calcium chloride and various alloying metals, such as magnesium, copper, silver, lead, zinc, and aluminum. A calcium-alloy product, easily separable from residual salts and other impurities, is obtained thereby.

As used herein, the term "inert atmosphere" is intended to include any gas which is substantially nonreactive with the reactants at the operational temperatures. Typical of gases appropriate for use in the present invention are: argon, neon, helium, and other inert gases.

Determination of the appropriate amounts of sludge, alloying metal, and calcium chloride is generally made on the basis of the desired composition of the calcium-containing alloy, and on the analysis of the sludge. Generally, about four times the stoichiometric amount of calcium chloride required to react with the sodium in the sludge to produce calcium metal and sodium chloride is employed. At least six times as much calcium chloride as sludge, by weight, is preferably employed where complete reaction is desired. Lower ratios of calcium chloride to sludge may be employed where complete reaction is not required. Ratios of less than about 3:1 are generally undesirable. The amount of alloying metal added to the melt is then determined as the amount required to make the desired alloy with the calcium metal available from the sludge and from the reaction of calcium chloride with sodium. The alloy product of the present invention generally contains from about one to about ninety-five percent calcium and from about ninety-nine to about five percent alloying metal, on a sodium-free basis, and may contain as much as nine percent residual sodium.

Under certain circumstances (when the calcium chloride-sludge weight ratio is less than about 6:1 and alloying metal is present in an amount less than twenty percent by weight of the calcium present), sufficient unreacted sodium metal may be present to form a separate phase. This sodium may be removed and recovered as by decanting the molten sodium metal from the molten calcium-containing alloy. Sodium metal in a separate phase tends to float on the alloy making recovery of the sodium relatively simple. When sodium is present as a separate phase, the residual sodium content of the calcium-containing alloy may be undesirably high. Residual sodium may be removed from the alloy as hereinbelow set forth.

As a general rule, the higher the percentage of alloying metal in the alloy, the lower the residual sodium content of the alloy. Also, excess amounts of calcium chloride tend to lower the amount of residual sodium in the alloy. Thus, the maximum amount of calcium chloride to be employed is usually determined by the degree of sodium removal desired.

Electrolytic cell sludges contemplated for use in the present invention usually contain from about sixty-five to ninety weight percent sodium, from about five to about thirty weight percent calcium, and from about five to about fifteen weight percent oxides and salts of sodium and calcium. Sludges obtained from Downs type cells are generally appropriate for use in the present invention.

Melting and mixing of the sludge with alloying metal and calcium chloride is usually accomplished at temperatures of from about 500 to about 800 degrees centigrade, and preferably from about 600 to about 700 degrees centigrade. At temperatures above about 800 degrees centigrade, residual sodium which may be present becomes undesirably soluble in the calcium-containing alloy, and undesirable calcium mono-chloride tends to be formed. At temperatures below about 500 degrees centigrade, melting of the alloying metal may become more difficult but may be accomplished by special techniques, such as by choosing a lower-melting alloy composition. It is essential only that the mixture be molten and maintained below about 800 degrees centigrade. Once melting of the mixture has been accomplished, it may be desirable to lower the temperature of the molten mixture thereby further decreasing the solubility of residual sodium in the calcium-containing alloy and obtaining a purer alloy product.

The alloy tends to be less dense than the molten salts and other impurities generally resulting in a two or (when sodium metal in excess of the solubility limit of the alloy is present) three-phase system. Salts and other impurities are usually removed as by decanting the alloy therefrom, but may be separated from the alloy by simple physical means after cooling. An exception is encountered with certain copper, silver, lead, and zinc alloys which are more dense than the salts. Molten, undissolved, residual sodium metal tends to float on the molten alloy and may be separated therefrom in the molten state. Residual sodium content of the alloy may be further reduced, if desired, by further successive treatments of the alloy by melting with calcium chloride.

Typical calcium-containing alloys which may be produced by the method of the present invention are those which contain (on a sodium-free basis): from about 20 to about 75 weight percent copper and from about 80 to about 25 weight percent calcium; from about 5 to about 80 weight percent silver and from about 95 to about 20 weight percent calcium; from about 20 to about 40 weight percent lead and from about 80 to about 60 weight percent calcium; from about 87 to about 99 weight percent lead and from about 13 to about 1 weight percent calcium; from about 3 to about 99 weight percent zinc and from about 97 to about 1 weight percent calcium; from about 7 to about 35 weight percent aluminum and from about 93 to about 65 weight percent calcium; from about 83 to about 99.9 weight percent aluminum and from about 17 to about 0.1 weight percent calcium; and, from about 4 to about 95 weight percent magnesium and from about 96 to about 5 weight percent calcium.

One use for which the above alloys have been found appropriate is, the deoxidizing of the alloying metal, i.e., calcium-copper alloy may be used to deoxidize copper, calcium-silver may be used to deoxidize silver, etc.

A better understanding of the present invention may be had in light of the following examples which are set forth to illustrate and are not to be construed to limit, the present invention.

*Example 1*

To a crucible, were charged 1.85 pounds of sludge from a Downs cell. The sludge analyzed approximately 67 weight percent sodium, 17 weight percent calcium, 1 weight percent calcium chloride, 0.8 percent sodium chloride, 5.4 weight percent calcium oxide and 8.5 weight percent sodium oxide, the balance being assorted trace materials. About ¼ pound of magnesium was added to the crucible, and the crucible and contents were heated to and maintained at about 700 degrees centigrade under an argon atmosphere and mixed for about 20 minutes. About 11½ pounds of calcium chloride pellets (containing about 95 weight percent CaCl₂) were then added to the charge in the crucible. When melting was complete, the mixture in the crucible was allowed to cool and solidify.

Impurities such as salts and the like were simply knocked off the cast calcium-magnesium alloy ingot. An ingot weighing 1.25 pounds and containing about 77.2 weight percent calcium, about 20.1 weight percent magnesium, about 1.5 weight percent sodium and the balance potassium, strontium, and like impurities was obtained.

*Example 2*

To the crucible of Example 1 were charged about 1.2 pounds of a sludge having substantially the same analysis as the sludge employed in said Example 1. About ⅛ pound of magnesium and about 8 pounds of calcium chloride pellets (containing about 95 percent CaCl₂) were added to the sludge in the crucible and the mixture was mixed and heated to about 700 degrees centigrade under an argon atmosphere. This temperature was maintained for about 20 minutes and the melt was then allowed to cool and solidify.

After removal of salts and the like, an ingot weighing 0.63 pound containing about 79.4 weight percent calcium, about 17.6 weight percent magnesium, about 2.2 weight percent sodium and the balance potassium, strontium, and like impurities was obtained.

*Example 3*

To a crucible such as that employed in Example 1 were charged 2.3 pounds of sludge from a different Downs cell. The sludge employed in this example analyzed 84.3 weight percent sodium, 7.5 weight percent calcium, 2.6 weight percent calcium oxide, and 5.6 weight percent sodium oxide. About ¼ pound of magnesium and 15.3 pounds of calcium chloride pellets (containing 95 percent CaCl₂) were added to the crucible. The mixture in the crucible was heated to and maintained at about 700 degrees centigrade under an argon atmosphere and mixed until the charge had melted. After the charge had melted, the molten mixture was cooled to about 400 degrees and held at that temperature for about 20 minutes while being mixed. After removing residual salts and the like from the melt, the melt was allowed to cool and solidify. A one and one-quarter pound ingot of an alloy analyzing about 79 weight percent calcium, about 19.5 weight percent magnesium, and about 1.5 weight percent sodium was obtained.

*Example 4*

To the same crucible employed in Example 3 was charged about 0.6 pound of the same Downs cell sludge employed in said Example 4. One pound of magnesium and 4 pounds of calcium chloride pellets (containing about 95 percent CaCl₂) were added to the charge in the crucible. After heating and melting the charge under an argon atmosphere the molten mixture was held at about 700 degrees centigrade for about 20 minutes while mixing and then allowed to cool. After cooling, the alloy formed was physically separated from the residual salts. The alloy analyzed at about 79.1 weight percent magnesium, about 20.5 weight percent calcium, and about 0.3 weight percent sodium, the balance being potassium, strontium and like impurities.

*Example 5*

Employing substantially the method and conditions outlined above, a mixture containing 30 parts sludge, 12 parts copper, and 200 parts calcium chloride is melted and stirred. About 25 parts of an alloy containing 58.2 weight percent calcium, 34.9 weight percent copper, and 0.9 weight percent sodium is obtained.

*Example 6*

When a mixture of about 30 parts sludge, 12 parts silver, and 200 parts calcium chloride is melted and stirred in accordance with the method and conditions outlined above, about 32 parts of calcium-silver alloy are obtained. The alloy has the composition: 56 weight percent calcium, 43 weight percent silver, and 1 weight percent sodium.

*Example 7*

A mixture of 30 parts sludge, 12 parts lead, and 200 parts calcium chloride is melted and stirred in accordance with the method and conditions outlined above. About 12 parts of an alloy containing 71.7 weight percent calcium, 22.9 weight percent lead, and 5.4 weight percent sodium are obtained.

*Example 8*

A mixture of 30 parts sludge, 200 parts calcium chloride, and 2.5 parts zinc is melted and stirred in accordance with the method and conditions outlined above. About 19 parts of an alloy containing 82.0 weight percent calcium, 11.2 weight percent zinc, and 6.8 weight percent sodium are obtained.

*Example 9*

A mixture containing 30 parts sludge, 200 parts calcium chloride, and 5 parts aluminum is melted and stirred in accordance with the method and conditions outlined above. About 19 parts of an alloy containing 72 weight percent calcium, 27 weight percent aluminum, and 1 weight percent sodium are obtained.

In substantially the same manner a mixture containing 30 parts sludge, 200 parts calcium chloride, and 74 parts aluminum is melted and stirred. About 87 parts of an alloy containing 14.5 weight percent calcium, 85 weight percent aluminum, and 0.5 weight percent sodium are obtained.

Various modifications may be made in the present invention without departing from the spirit or scope thereof, and it is to be understood that I limit myself only as defined in the appended claims.

I claim:

1. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least 3 parts by weight of calcium chloride per part of sludge, and (b) sufficient alloying metal selected from the group consisting of copper, silver, lead, zinc, aluminum, and magnesium, to produce a calcium alloy containing (on a sodium-free basis) from about one to about ninety-five weight percent calcium and from about ninety-nine to about five percent alloying metal, and up to nine weight percent residual sodium; and (3) separating said calcium-alloying metal alloy from the resulting mixture.

2. A method of utilizing electrolytic sodium cell sludge which comprises: (1) providing a sodium and calcium-containing sludge from an electrolytic cell; (2) melting and mixing said sludge under an inert atmosphere and at a temperature of from about 500 to about 800 degrees centigrade, with (a) at least three parts by weight calcium chloride per part of sludge, and (b) sufficient alloying metal selected from the group consisting of copper, silver, lead, zinc, aluminum, and magnesium, to produce a calcium alloy containing (on a sodium-free basis) from about one to about ninety-five weight percent calcium and from about ninety-nine to about five percent alloying metal, and up to nine weight percent residual sodium; and (3) separating said calcium-alloying metal alloy from the resulting mixture.

3. A method of utilizing sodium value in an electrolytic sodium cell sludge which comprises: (1) providing a sodium and calcium-containing sludge from an electrolytic cell; (2) melting and mixing said sludge under an inert atmosphere and at a maximum temperature of about 800 degree centigrade, with (a) at least six parts by weight calcium chloride per part of sludge, and (b) sufficient alloying metal selected from the group consisting of copper, silver, lead, zinc, aluminum, and magnesium, to produce a calcium alloy containing (on a sodium-free basis) from about one to about ninety-five weight percent calcium and from about ninety-nine to about five percent alloying metal, and up to nine weight percent residual sodium; and (3) separating said calcium-alloying metal alloy from the resulting mixture.

4. A method of recovering calcium values from an electrolytic sodium cell sludge which comprises: (1) providing a sodium and calcium-containing sludge from an electrolytic cell; (2) melting and mixing said sludge under an inert atmosphere and at a temperature of from about 500 to about 800 degrees centigrade, with (a) at least six parts by weight calcium chloride per part of sludge, and (b) sufficient alloying metal selected from the group consisting of copper, silver, lead, zinc, aluminum, and magnesium, to produce a calcium alloy containing (on a sodium-free basis) from about one to about ninety-five weight percent calcium and from about ninety-nine to about five percent alloying metal, and up to nine weight percent residual sodium; and (3) separating said calcium-alloying metal alloy from the resulting mixture.

5. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient copper to produce a calcium-copper alloy containing (on a sodium-free basis) from about twenty to about seventy-five weight percent copper and from about eighty to about twenty-five percent calcium, and up to nine weight percent residual sodium; and (3) separating said calcium-copper alloy from the resulting mixture.

6. A method of utilizing electrolytic sodium cell sludge which comprises: (1) providing a sodium and calcium-containing sludge from a Downs cell; (2) melting and mixing thirty parts of said sludge under an inert atmosphere and at a temperature of from about 500 to about 800 degrees centigrade, with (a) two hundred parts of calcium chloride, and (b) twelve parts of copper, thereby producing a calcium-copper alloy containing 58.2 weight percent calcium, 34.9 weight percent copper, and 0.9 weight percent sodium; and (3) separating said calcium-copper alloy from the resulting mixture.

7. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient silver to produce a calcium-silver alloy containing (on a sodium-free basis) from about five to about eighty weight percent silver and from about ninety-five to about twenty weight percent calcium, and up to nine weight percent residual sodium; and (3) separating said calcium-silver alloy from the resulting mixture.

8. A method of utilizing electrolytic sodium cell sludge which comprises: (1) providing a sodium and calcium-containing sludge from a Downs cell; (2) melting and mixing thirty parts of said sludge under an inert atmosphere and at a temperature of from about 500 to about 800 degrees centigrade, with (a) two hundred parts of calcium chloride, and (b) twelve parts of silver, thereby producing a calcium-silver alloy containing fifty-six weight percent calcium, forty-three weight percent silver, and one weight percent sodium; and (3) separating said calcium-silver alloy from the resulting mixture.

9. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient lead to produce a calcium-lead alloy containing (on a sodium-free basis) from about twenty to about forty weight percent lead and from about eighty to about sixty weight percent calcium, and up to nine weight percent residual sodium; and (3) separating said calcium-lead alloy from the resulting mixture.

10. A method of utilizing electrolytic sodium cell sludge which comprises (1) providing a sodium and calcium-containing sludge from a Downs cell; (2) melting and mixing thirty parts of said sludge under an inert atmosphere and at a temperature of from about 500 to about 800 degrees centigrade, with (a) two hundred parts of calcium chloride, and (b) twelve parts of lead, thereby producing a calcium-lead alloy containing 71.7 weight percent calcium, 22.9 weight percent lead, and 5.4 weight percent sodium; and (3) separating said calcium-lead alloy from the resulting mixture.

11. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient lead to produce a calcium-lead alloy containing (on a sodium-free basis) from about eighty-seven to about ninety-nine weight percent lead and from about thirteen to about one weight percent calcium, and up to nine weight percent residual sodium; and (3) separating said calcium-lead alloy from the resulting mixture.

12. A method of utilizing electrolytic sodium cell sludge which comprises: (1) providing a sodium and calcium-containing sludge from a Downs cell; (2) melting and mixing said sludge under an inert atmosphere and at a temperature of from about 500 to about 800 degrees centigrade, with (a) at least six parts by weight calcium chloride per part of sludge, and (b) sufficient lead to produce a calcium-lead alloy containing (on a sodium-free basis) from about eighty-seven to about ninety-nine weight percent lead and from about thirteen to about one weight percent calcium, and up to nine weight percent residual sodium; and (3) separating said calcium-lead alloy from the resulting mixture.

13. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient zinc to produce a calcium-zinc alloy containing (on a sodium-free basis) from about three to about ninety-nine weight percent zinc and from about ninety-seven to about one weight percent calcium, and up to nine weight percent residual sodium; and (3) separating said calcium-zinc alloy from the resulting mixture.

14. A method of utilizing electrolytic sodium cell sludge which comprises: (1) providing a sodium and calcium-containing sludge from a Downs cell; (2) melting and mixing thirty parts of said sludge under an inert atmosphere and at a temperature of from about 500 to about 800 degrees centigrade, with (a) two hundred parts of calcium chloride and (b) two and one-half parts of zinc, thereby producing a calcium-zinc alloy containing 82 weight percent calcium, 11.2 weight percent zinc, and 6.8 weight percent sodium; and (3) separating said calcium-zinc alloy from the resulting mixture.

15. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient aluminum to produce a calcium-aluminum alloy containing (on a sodium-free basis) from about seven to about thirty-five weight percent aluminum and from about ninety-three to about sixty-five weight percent calcium, and up to nine weight percent residual sodium; and (3) separating said calcium-aluminum alloy from the resulting mixture.

16. A method of utilizing electrolytic sodium cell sludge which comprises: (1) providing a sodium and calcium-containing sludge from a Downs cell; (2) melting and mixing thirty parts of said sludge under an inert atmosphere and at a temperature of from about 500 to about 800 degrees centigrade, with (a) two hundred parts of calcium chloride, and (b) five parts of aluminum, thereby producing a calcium-aluminum alloy containing 72 weight percent calcium, 27 weight percent aluminum, and 1 weight percent sodium; and (3) separating said calcium-aluminum alloy from the resulting mixture.

17. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient aluminum to produce a calcium-aluminum alloy containing (on a sodium-free basis) from about 83 to about 99.9 weight percent aluminum and from about 17 to about 0.1 weight percent calcium, and up to nine weight percent residual sodium; and (3) separating said calcium-aluminum alloy from the resulting mixture.

18. A method of utilizing electrolytic sodium cell sludge which comprises: (1) providing a sodium and calcium-containing sludge from a Downs cell; (2) melting and mixing thirty parts of said sludge under an inert atmosphere and at a temperature of from about 500 to about 800 degrees centigrade, with (a) two hundred parts of calcium chloride, and (b) seventy-four parts of aluminum, thereby producing a calcium-aluminum alloy containing 14.5 weight percent calcium, 85 weight percent aluminum, and 0.5 weight percent sodium; and (3) separating said calcium-aluminum alloy from the resulting mixture.

19. A method of utilizing electrolytic sodium cell sludge which comprises: (1) providing a sodium and calcium-containing sludge from an electrolytic cell; (2) melting and mixing said sludge under an inert atmosphere and at a maximum temperature of about 800 degrees centigrade, with (a) at least three parts by weight calcium chloride per part of sludge, and (b) sufficient magnesium to produce a calcium-magnesium alloy containing (on a sodium free basis) from about four to about ninety-five weight percent magnesium and from about ninety-six to about five weight percent calcium, and up to nine weight percent residual sodium; and (3) separating said calcium-magnesium alloy from the resulting mixture.

20. A method of utilizing electrolytic sodium cell sludge which comprises: (1) providing a sodium and calcium-containing sludge from an electrolytic cell; (2) melting and mixing said sludge under an inert atmosphere and at a temperature of from about 500 to about 800 degrees centigrade, with (a) at least six parts by weight calcium chloride per part of sludge, and (b) sufficient magnesium to produce a calcium-magnesium alloy containing (on a sodium-free basis) from about four to about ninety-five weight percent magnesium, and from about ninety-six to about five weight percent calcium, and up to nine weight percent residual sodium; and (3) separating said calcium-magnesium alloy from the resulting mixture.

21. A method of utilizing electrolytic sodium cell sludge which comprises: (1) providing a sodium and calcium-containing sludge from a Downs cell; (2) melting and mixing thirty parts of said sludge under an inert atmosphere and at a temperature of about 700 degrees centigrade, with (a) two hundred parts of calcium chloride, and (b) three and one-quarter parts of magnesium, thereby to produce a calcium-magnesium alloy containing 79 weight percent calcium, 19.5 weight percent magnesium, and 1.5 weight percent sodium; and (3) separating said calcium-magesium alloy from the resulting mixture.

References Cited by the Examiner

UNITED STATES PATENTS

| | | | |
|---|---|---|---|
| 1,935,245 | 11/1933 | Kirsebom | 75—67 |
| 2,448,000 | 8/1948 | Kemmer | 75—67 |
| 2,735,668 | 2/1956 | Gruber et al. | 75—63 |
| 2,955,936 | 10/1960 | Deyrup | 75—135 |
| 2,960,397 | 11/1960 | Cobel | 75—63 |

DAVID L. RECK, *Primary Examiner.*

R. O. DEAN, *Assistant Examiner.*